Dec. 19, 1961
W. C. POUPPIRT
3,013,820
ETHYLENE POLYMER PIPE COUPLING HAVING
PARTICULAR THREAD FORMATIONS
Filed Sept. 23, 1957
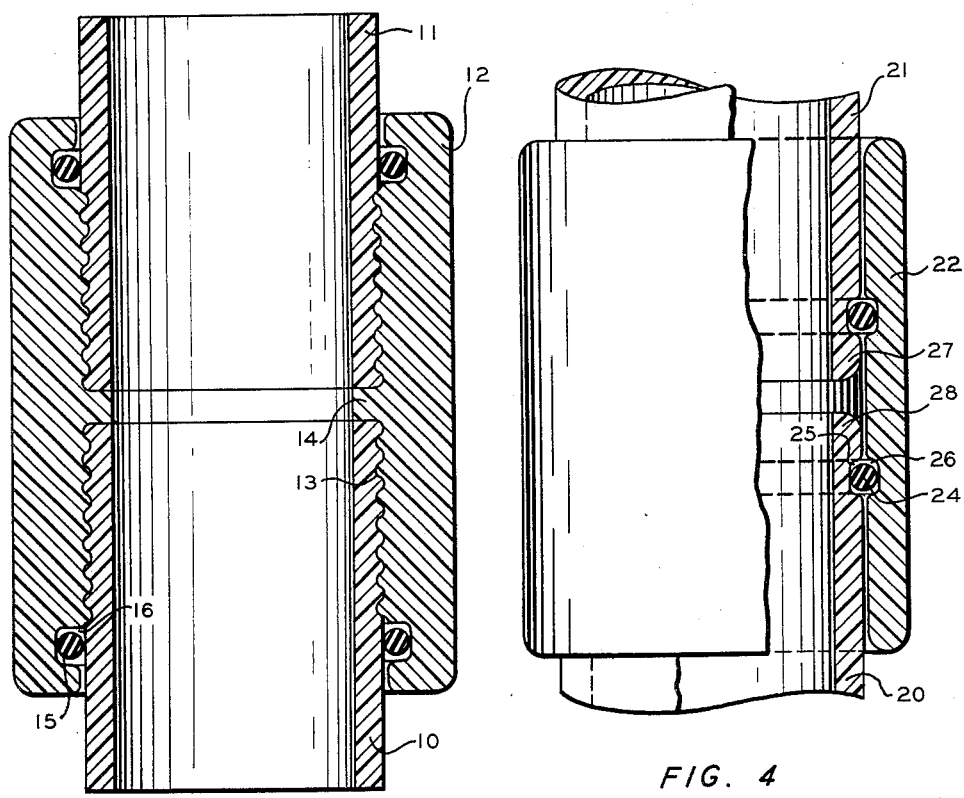
FIG. 1
FIG. 4
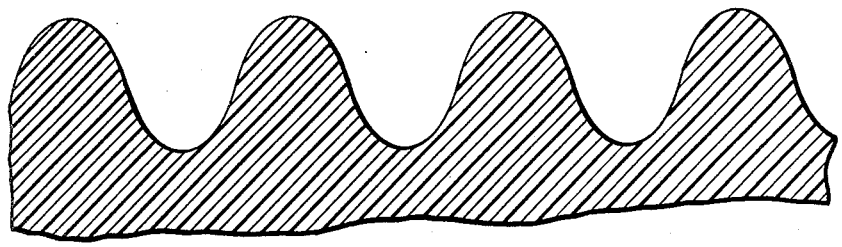
FIG. 3
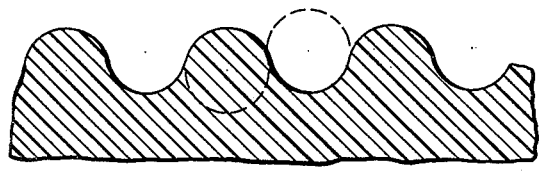
FIG. 2
INVENTOR.
W.C. POUPPIRT
BY *Hudson and Young*
ATTORNEYS

United States Patent Office 3,013,820
Patented Dec. 19, 1961

3,013,820
ETHYLENE POLYMER PIPE COUPLING HAVING PARTICULAR THREAD FORMATIONS
Walter C. Pouppirt, Bartlesville, Okla., assignor to Phillips Petroleum Company, a corporation of Delaware
Filed Sept. 23, 1957, Ser. No. 685,568
2 Claims. (Cl. 285—355)

This invention relates to pipe couplings and a method for joining lengths of ethylene polymer pipe. In one of its aspects this invention relates to pipe couplings for use with ethylene polymer pipe. In another of its aspects this invention relates to a method for joining lengths of pipe of plastics such as ethylene polymers and other semi-rigid materials having high notch sensitivity and high cold creep characteristics.

A recent discovery in the art of making 1-olefin polymers in general and a polymer of polyethylene in particular has created a new and widespread interest in these polymers. This discovery is a method for making polyethylene which has a high degree of crystallinity with the concomitant benefits of high melting point, high density and high value of tensile strength. These polymers find particular utility in the form of pipe and tubing used to transport fluids under low pressure and high pressure, low pressure service being that of up to 100 pounds and high pressure service, in this case, being pressures from 100 pounds up to about 750 pounds per square inch. The new technique of olefin polymerization is applicable to 1-olefins having a maximum of 8 carbon atoms per molecule and no branching nearer the double bond than the 4-position and is carried out at temperatures and pressures which are relatively low as compared with conventional processes for polymerizing such olefins. Such polymerization is sometimes carried out by first admixing and at least partially dissolving the olefins in a non-polymerizable solvent and by carrying out the polymerization in the presence of a catalyst.

In the copending application of Hogan et al. filed December 20, 1954, Serial No. 476,306, now U.S. Patent 2,825,721, issued March 4, 1958, a process is disclosed for producing polymers of 1-olefins by carrying out the polymerization at a temperature in the range of 100 to 500° F. in the presence of 0.1 to 10 or more weight percent of chromium oxide, preferably including a substantial proportion of hexavalent chromium associated with at least one porous oxide selected from the group consisting of silica, alumina, zirconia, and thoria. A preferred catalyst is one comprising 0.1 to 10 or more weight percent chromium as chromium oxide supported upon a silica-alumina base such as 90 percent silica-10 percent alumina. The catalyst employed is ordinarily a highly oxidized catalyst which has been achieved by treatment at an elevated temperature under non-reducing conditions and preferably in an oxidizing atmosphere. Olefins, other than 1-olefins as described, are polymerized by the action of this catalyst but some such polymers are predominantly liquid, at least when polymerized under the described conditions. Polymerization suitably is carried out in the presence of a hydrocarbon solvent or diluent, especially a paraffin or a cycloparaffin which is liquid under the polymerization conditions; however, vapor phase operation or mixed phase operation can be effected. Diolefins such as 1,3-butadiene and isoprene are within the scope of this invention. Solid ethylene polymers include polyethylene and copolymers comprising a major proportion of ethylene and a minor proportion of a 1-olefin such as propylene, 1-butene, and the like wherein the ratio of ethylene to higher molecular weight 1-olefin is such that solid polymers are produced. The higher molecular weight 1-olefin is present in no more than about 20 weight percent of the total monomer mixture.

Polyethylene according to the process of the above-identified copending application has a crystallinity value of 90 percent and higher. The crystallinity values are determinable by the X-ray diffraction method of Matthews, Peiser, and Richards, Acta Cryst. 2, 85 (1949), utilizing a North American Philips Diffractometer, a Geiger-Mueller detector, and strip chart recording and are duplicatable by infra-red and by nuclear resonance methods.

Ethylene polymer pipe joints have been made successfully by welding and also by flange connections where the flanges are welded to the ends of the pipe joints and the couplings then made by bolting the halves of the flanges together. These types of joints, however, have disadvantages in that certain uses, and as an example the welding of pipes in field service, are time consuming and require the presence of a skilled person. As another example the use of flanges is time consuming, expensive and cumbersome. Threaded couplings are preferred where they can be used for reasons of convenience and economy; however, threaded fittings have not been successful in ethylene polymer pipes and in other plastic pipes wherein the materials are subject to notch sensitivity and to cold creep characteristics. Threaded fittings must accomplish two purposes; they must provide a leak-proof connection; and they must hold the pipe to the fitting under full operating pressure, stress and environmental conditions.

It is, therefore, a principal object of this invention to provide a coupling suitable for use with ethylene polymers having high notch sensitivity and cold creep characteristics which at the same time has advantages of conventional threaded couplings.

It is also an object of this invention to provide a method for forming threads on a highly crystalline ethylene polymer pipe without imparting thereto the characteristic of high notch sensitivity where there is the tendency for stress failure at sharp peaks or sharp valleys of threads.

Other objects and advantages of this invention will be apparent to one skilled in the art upon studying this disclosure including the attached drawing.

FIGURE 1 is a cross section of a coupling according to the invention.

FIGURE 2 is a detail of a thread construction according to the invention.

FIGURE 3 is a detail of another thread construction of the invention.

FIGURE 4 is a partial cross section of another embodiment of the coupling of the invention.

Broadly the invention contemplates a threaded joint for high pressure use with plastic materials, such as ethylene polymers having characteristics of high crystallinity and high density which however are subject to high notch sensitivity by constructing the threads with shallow valleys and rounded peaks so that the thread radii meet on a tangent rather than on a diameter so that the pull-out force results in compression rather than shear on the thread. A fluid seal is effected with a toroidal ring of resilient material commonly referred to as an O-ring. A threaded coupling is not required for low pressure service; both the seal and coupling being effected by the O-ring. High pressure service for plastic pipe is considered to be from about 100 to 750 p.s.i. and low pressure service is considered to be atmospheric to about 100 p.s.i.

The term vermiculate threads, as used in the specification and claims refers to shallow threads having rounded crests and roots and having no plane surfaces. One type of vermiculate thread is arcuate, that is a cross-section of the thread is made up of arcs of identical circles whose radii meet on a tangent rather than on a diameter. Another type of vermiculate thread is sinusoidal, that is a cross-section of the thread is a sine-curve. These threads avoid sharp angles at the crest and root of the thread.

Referring now to the drawing and particularly to FIGURE 1, polyethylene pipes 10 and 11 are secured in coupling 12 by means of matching arcuate threads 13 on the pipes 10 and 11 and in the coupling 12. The ends of the pipes butt against shoulder 14 to provide smooth, streamline flow through the joint. A fluid seal is provided by O-ring 15 positioned in groove 16 of the coupling 12. The grooves 16 as well as the exterior portions of coupling 12 are constructed with rounded corners so as to avoid sharp edges and sharp valleys. These rounded edges prevent setting up areas of environmental stress and strain due to the high notch sensitivity of the solid polyethylene.

FIGURE 2 shows one modification of vermiculate threads which describe an undulating path rather than being constructed of sharp peaks and valleys and the modification of FIGURE 2 represents arcuate threads which are constructed of arcs of identical circles which touch on a tangent rather than on the diameters so that the pressure of the fluid within the pipe exerts a compression force upon the threads rather than a shear force against the threads.

FIGURE 3 shows a detail of vermiculate thread which describes a sinusoidal wave wherein pressure of the fluid in the pipe also exerts a compression force on the threads.

FIGURE 4 shows a modification of the invention designed for low pressure service wherein joints of pipes 20 and 21 are secured in coupling 22 by O-rings 24 positioned in grooves 25 and 26. The ends of pipe joints 21 are beveled at 27 and 28 and all corners and edges are rounded.

The pipe connection of FIGURE 1 comprises a flexible seal and a rigid mechanical connection which is applicable for high pressure service. The flexible seal is provided by the O-ring which is preferably made of a resilient material such as rubber and is placed under compression when the connection is completed. The rigid connection part of the joint is formed by the threads 13 on the pipe joints 10 and 11 and matching threads in the coupling 12.

In FIGURE 4 the pipes 20 and 21 are joined by means of the coupling 22 having O-rings 24 placed in compression between the pipes and the coupling. This coupling, which comprises a flexible seal in a flexible mechanical connection, is applicable for low pressure service.

Two-inch pipes and couplings were made from solid polyethylene produced by the process disclosed in copending application Serial No. 476,306, filed December 20, 1954, by Hogan et al. wherein ethylene was polymerized in the presence of liquid cyclohexane and a catalyst comprising a coprecipitated silica-alumina (90–10) base impregnated with chromium oxide containing an appreciable amount of hexavalent chromium. The resulting polyethylene had a crystallinity of 93 to 95 percent. A joint of two-inch pipe was made according to FIGURE 1 of the drawing wherein the thread design was arcuate as in FIGURE 2 and had a thread depth of 0.078-inch. There were 2⅜ inches of threads on each end of the pipe and corresponding threads in the coupling. The O-ring grooves in the coupling were 0.173-inch deep and 0.28-inch in cross section. Rubber O-rings having a cross sectional diameter of 3/16 inch were used.

In repeated tests, joints as above described have withstood 750 p.s.i. in hydraulic tests and have given satisfactory service in use.

Joints were made of 2-inch polyethylene pipe, as described above, according to FIGURE 4 wherein the same size O-rings were used as in the design of FIGURE 1 and the grooves were the same cross section as in FIGURE 1 but the depth was only 0.085 in each of the coupling and the pipe. This joint withstood 100 p.s.i. in hydraulic tests.

Reasonable variations and modifications are possible within the scope of the disclosure of the invention as described and illustrated without departing from scope or spirit of the invention.

I claim:

1. A pipe coupling assembly comprising a pipe of solid polyethylene having a crystallinity value of at least about 90 percent, said pipe having adjacent the end thereof arcuate threads which are constructed so that a cross-section of the peaks and valleys of said threads defines a series of arcs of identical circles wherein a line passing through the centers of two adjacent circles formed by completing the circles of arcs of a peak and adjacent valley is tangent to the arcs representing the adjacent thread peak on one side and the adjacent thread valley on the other side of said two circles; a collar of solid polyethylene having a crystallinity value of at least about 90 percent, said collar having threads substantially identical to, and adapted for operative engagement with, the threads of said pipe, spaced from the ends of the collar and terminating in a shoulder at about the center of the collar, said collar having an annular groove about its interior adjacent each end; and a resilient toroidal gasket positioned in each groove.

2. A pipe coupling assembly comprising a pipe of solid polyethylene having adjacent the end thereof arcuate threads which are constructed so that a cross-section of the peaks and valleys of said threads defines a series of arcs of identical circles wherein a line passing through the centers of two adjacent circles formed by completing the circles of arcs of a peak and adjacent valley is tangent to the arcs representing the adjacent thread peak on one side and the adjacent thread valley on the other side of said two circles; a collar of solid polyethylene having threads substantially identical to, and adapted for operative engagement with, the threads of said pipe, spaced from the ends of the collar and terminating in a shoulder at about the center of the collar, said collar having an annular groove about its interior adjacent each end; and a resilient toroidal gasket positioned in each groove.

References Cited in the file of this patent

UNITED STATES PATENTS

| | | |
|---|---|---|
| 702,596 | Ryan | June 17, 1902 |
| 1,394,791 | Runyan | Oct. 25, 1921 |
| 2,146,641 | McWane | Feb. 7, 1939 |
| 2,150,221 | Hinderliter | Mar. 14, 1939 |
| 2,187,217 | Winslow | Jan. 16, 1940 |
| 2,224,222 | Geyer | Dec. 10, 1940 |
| 2,294,160 | Crane | Aug. 25, 1942 |
| 2,380,690 | Graham | July 31, 1945 |
| 2,568,232 | Hamer | Sept. 18, 1951 |
| 2,601,040 | Livingstone | June 17, 1952 |
| 2,702,199 | McDonnell | Feb. 15, 1955 |
| 2,711,171 | Dunnican | June 21, 1955 |
| 2,739,829 | Pedlow | Mar. 27, 1956 |

FOREIGN PATENTS

| | | |
|---|---|---|
| 543,733 | Great Britain | Mar. 10, 1942 |
| 1,101,379 | France | Apr. 20, 1955 |
| 739,575 | Great Britain | Nov. 2, 1955 |
| 1,141,071 | France | Mar. 11, 1957 |

OTHER REFERENCES

Parker O-rings, Catalog 903, The Parker Appliance Company, Cleveland and Los Angeles, October 1950.